US008707191B2

(12) United States Patent
Chen et al.

(10) Patent No.: US 8,707,191 B2
(45) Date of Patent: Apr. 22, 2014

(54) MULTI-SCREEN SYNTHESIZING DISPLAY APPARATUS AND METHOD

(75) Inventors: Wei Chen, Shenzhen (CN); Li Yao, Shenzhen (CN)

(73) Assignee: Shenzhen Mindray Bio-Medical Electronics Co., Ltd, Shenzhen (CN)

( * ) Notice: Subject to any disclaimer, the term of this patent is extended or adjusted under 35 U.S.C. 154(b) by 537 days.

(21) Appl. No.: 11/515,083

(22) Filed: Sep. 1, 2006

(65) Prior Publication Data

US 2007/0216700 A1 Sep. 20, 2007

(30) Foreign Application Priority Data

Mar. 15, 2006 (CN) .......................... 2006 1 0034494

(51) Int. Cl.
*G06F 3/00* (2006.01)
*G06F 3/048* (2013.01)

(52) U.S. Cl.
USPC ........... 715/766; 715/764; 715/810; 715/790; 715/781; 715/794; 715/788

(58) Field of Classification Search
USPC ......... 715/766, 764, 781, 794, 790, 788, 810; 345/342, 4; 348/565, 568, 584, 559
See application file for complete search history.

(56) References Cited

U.S. PATENT DOCUMENTS 4,658,351 A * 4/1987 Teng ............................ 718/103
4,704,697 A * 11/1987 Kiremidjian et al. .......... 345/568
4,868,765 A * 9/1989 Diefendorff .................. 715/797
4,954,818 A * 9/1990 Nakane et al. ................ 715/790
5,129,055 A * 7/1992 Yamazaki et al. ............ 715/807
5,146,335 A * 9/1992 Kim et al. ...................... 348/564
5,286,505 A * 2/1994 Hartson et al. ................ 426/321
5,398,074 A * 3/1995 Duffield et al. ............... 348/564
5,657,096 A * 8/1997 Lukacs ......................... 348/585

(Continued)

FOREIGN PATENT DOCUMENTS

CN 1713264 A 12/2005

OTHER PUBLICATIONS

Microsoft Corporation, Microsoft Windows XP Screen Dumps, Microsoft Corporation, pp. 1-2.*

*Primary Examiner* — Amy Ng
*Assistant Examiner* — Erik Stitt
(74) *Attorney, Agent, or Firm* — Kory D. Christensen; Stoel Rives LLP

(57) ABSTRACT

A multi-screen synthesizing apparatus and method have been disclosed by the present invention. Display data of windows required to be displayed on the display terminal are mapped onto at least one logical screen by storing data in a video memory. Each of the windows is correlated with a set of window registers, and the location coordinates of the window and the identification of the corresponding logical screen are stored into the window register set when displaying the windows, the window register set having the highest priority level are found out, based on the location coordinates of the current scanning pixel, as the selected window register. The display data corresponding to the current pixel are read out from the logical screen corresponding to the selected window register and output to the display terminal. According to the present invention, the display data are not necessary to be written repeatedly during the switching operations of windows, thus the overhead for the CPU to process the display task can be reduced without increasing the occupied bandwidth. Thereby the display efficiency of various electronic devices having display ability can be improved and the display cost can be reduced.

14 Claims, 4 Drawing Sheets

(56) References Cited

U.S. PATENT DOCUMENTS

| | | | | | |
|---|---|---|---|---|---|
| 5,737,011 | A * | 4/1998 | Lukacs | 348/14.09 |
| 5,835,360 | A * | 11/1998 | Jansen | 363/21.04 |
| 5,892,511 | A * | 4/1999 | Gelsinger et al. | 715/794 |
| 5,923,307 | A * | 7/1999 | Hogle, IV | 345/4 |
| 6,018,340 | A * | 1/2000 | Butler et al. | 715/764 |
| 6,046,777 | A * | 4/2000 | Patton et al. | 348/565 |
| 6,348,868 | B1 * | 2/2002 | Chou | 340/584 |
| 6,348,933 | B1 * | 2/2002 | Walls et al. | 715/744 |
| 6,822,659 | B2 * | 11/2004 | Marion et al. | 345/629 |
| 7,071,944 | B2 * | 7/2006 | MacInnis et al. | 345/505 |
| 7,154,558 | B2 * | 12/2006 | Yui et al. | 348/565 |
| 7,356,823 | B2 * | 4/2008 | Martyn | 719/323 |
| 7,598,958 | B1 * | 10/2009 | Kelleher | 345/504 |
| 7,616,206 | B1 * | 11/2009 | Danilak | 345/505 |
| 2002/0075407 | A1 * | 6/2002 | Cohen-Solal | 348/565 |
| 2003/0063893 | A1 * | 4/2003 | Read | 386/46 |
| 2005/0286639 | A1 * | 12/2005 | Aggarwal et al. | 375/240.25 |
| 2006/0150225 | A1 * | 7/2006 | Hegg et al. | 725/89 |
| 2006/0257099 | A1 * | 11/2006 | Potrebic et al. | 386/68 |
| 2007/0103590 | A1 * | 5/2007 | Azar et al. | 348/459 |
| 2007/0140537 | A1 * | 6/2007 | Heigl et al. | 382/128 |
| 2007/0174778 | A1 * | 7/2007 | Johnson et al. | 715/764 |

* cited by examiner

MULTI-SCREEN SYNTHESIZING DISPLAY APPARATUS AND METHOD

TECHNICAL FIELD

The present invention relates to a display apparatus and a method for synthesizing multi-screen display data and displaying the synthesized data on the same screen.

BACKGROUND ART

There exist interactive display screens on most of the electronic devices for displaying various data, curves, graphs, images and the like on the display terminal (for example, CRT (cathode ray tube) or LCD (liquid crystal display)) through the cooperation of software and hardware. Conventional display techniques map a display terminal onto a two-dimensional array (which corresponds to a physical device called video memory), each pixel on the display terminal is mapped onto an element of the two-dimensional array, whose value is the color code of the pixel, and the ordinate and abscissa of the pixel are the two indices of the two-dimensional array. That is, the pixel with indices (x, y) on the display terminal is mapped onto the element A(x, y) of the two-dimensional array. The system calculates the values of the two-dimensional array based on the graph to be displayed and writes them into corresponding positions of the video memory and then the display driving module reads the display data out of the video memory and transforms them into pixel matrix information, and finally displays the picture on the display terminal. A window refers to a particular region opened on the display terminal for displaying, specific contents, such as a menu, dialogue boxes, charts, images and the like. A window corresponds to a set of display data stored in corresponding positions of the video memory. To display a window is to write display data of the window into the corresponding positions thereof in the video memory.

In the above mentioned display architecture, the display terminal is in one-to-one correspondence with the video memory. Every updating of the display screen is in correspondence with the updating operation of the display data in the video memory. In case of frequently opening and closing of certain windows, it implies the frequent write-in of display data into the video memory and thus a relatively high bandwidth is required. Practically, however, many of such write-in operations into the video memory are unnecessary. For example, a menu, dialogue box and the like are frequently required to the displayed on the display terminal. When some instructions are entered by the user, next menu or dialogue box may overlap cut ones. In reverse, when other instructions are entered by the user, the overlapping menus or dialogue boxes will disappear level by level, lastly the original display will recover on the display terminal. The physical operations corresponding to the above mentioned display variation processes on the display terminal are as follows: display data of the menus or dialogue boxes are written into the video memory in order. When a certain menu or dialogue box disappears, the display data overlapped by it are re-written into the video memory. Since the portion on the display terminal overlapped by the menu or dialogue box remains the same when it pops out, when the menu or dialogue box disappears, it is obviously an unnecessary operation to re-write the same data into the video memory. This causes a low efficiency of the display of windows and the consumption of extra processing resources and memory bandwidth. As for such types of devices as the desk top computers, such kind of consumption may be negligible because the processing capability of CPU and the bandwidth are sufficiently high. However, as for the majority of the embedded systems with limited resources, increasing the processing capability of CPU and the memory bandwidth means significant cost.

SUMMARY OF THE INVENTION

It is, therefore, an object of the present invention is to resolve the above technical problem by providing a multi-screen synthesizing display apparatus and method. According to present invention, the consumption of the processing resources and the memory bandwidth is relatively low, and display of multiple windows can be realized without increasing the processing overhead and the memory bandwidth, so the performance of various kinds of electronic devices with display ability can be increased while the cost can be decreased.

The advantageous effects of the present invention lie in that: the present invention maps the physical display terminal into a plurality of logical screens, and to display various pictures is mapped into writing data into different logical screens. When windows are displayed, different windows may be written into same or different logical screens; different windows are correlated to window registers with different priority levels. The display data of multiple logical screens are synthesized into a final display screen to be displayed on the physical terminal according to specific overlapping rule. The operations of pop-out, closing or switching and etc of windows can be realized by changing the synthesizing mode. The alternation of window needs not to repeatedly write-in the display data, thus the overhead for the CPU to process the display task and the bandwidth occupied by writing into the video memory can be reduced. It is not necessary to read out data of all the logical screens when reading the display data, but only the data of the logical screen corresponding to each pixel shall be read out according to the windows overlapping rule. That is, the bandwidth occupied by reading video memory is not increased, thus the processing speed for the CPU of various electronic devices having display ability can be improved, and the display efficiency can be increased and the display cost can be decreased as well.

The features and advantages of the present invention will be explained in detail in the embodiments with reference to the accompanying figures.

PREFERRED EMBODIMENT

Figure 1:
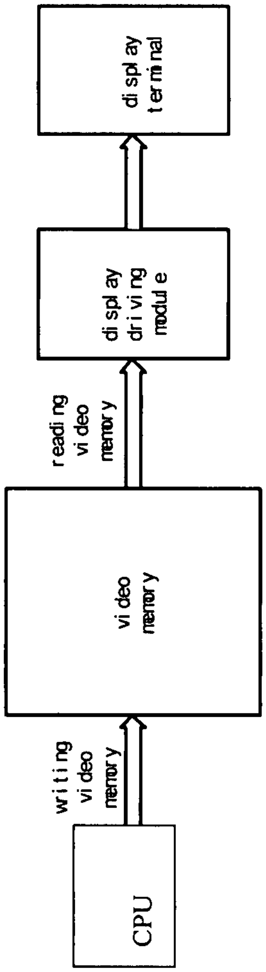
FIG. 1 is a diagram showing a display system in the prior art.
Figure 2:
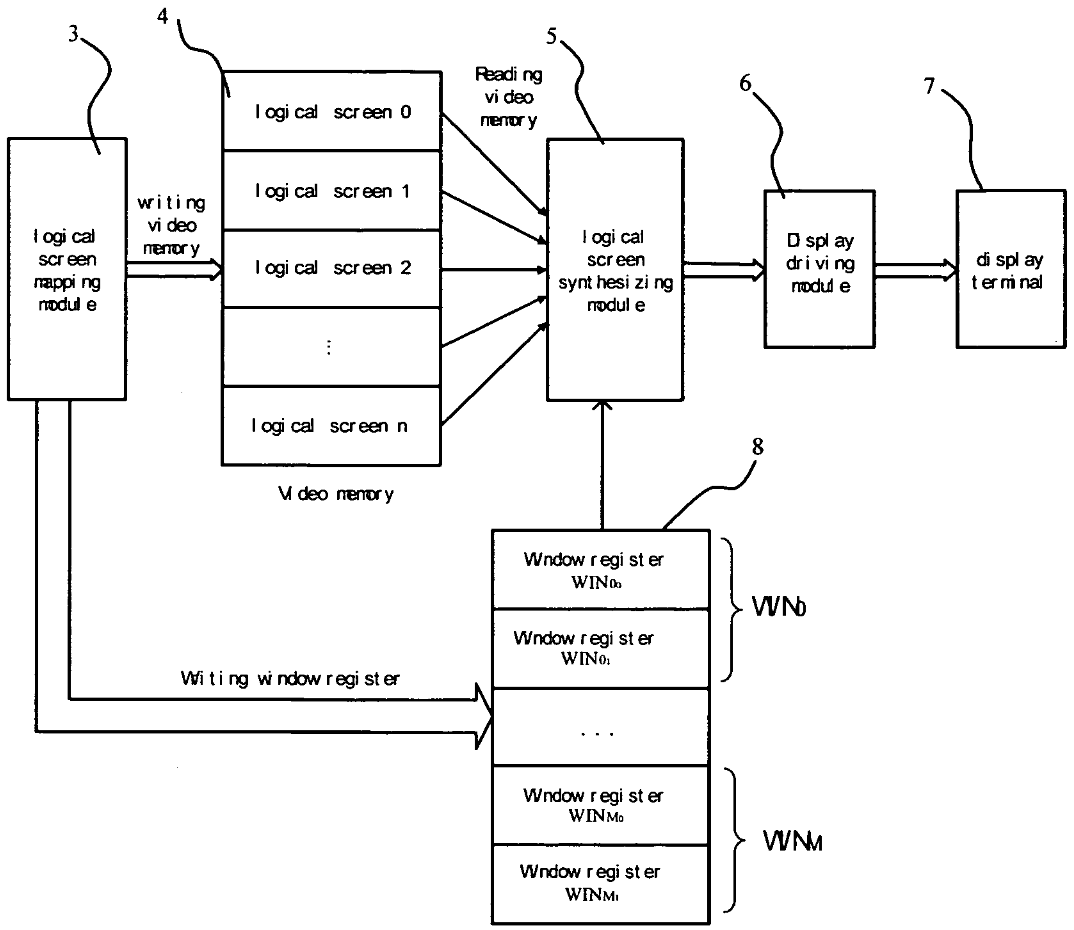
FIG. 2 is a block diagram showing a multi-screen display system according to the present invention.

FIG. 2 is a block diagram showing the multi-screen synthesizing display system according to the present invention. The system comprises a logical screen mapping module 3, a video memory 4, a logical screen synthesizing module 5, a display driving module 6, a display terminal 7 and a window register stack 8. The video memory 4 is divided into a plurality of logically separate blocks 0-N. The logical screen mapping module 3 may be a CPU which performs a program embedded therein, or may be other hardware circuits. A plurality of windows may be displayed on the display terminal 7. All the windows needed to be displayed on the display terminal are mapped onto one or more said logical blocks in the video memory 4 by the logical careen mapping module 3, thus, these mapped logical blocks are referred to as logical screens 0-N. For example, if the display terminal has a resolution 1280×1024, and the word length of display data is 16 bits, then the logical screens 0-n correspond to (N+1) regions in the video memory 4, each of which comprises 1280×1024 words for storing their display data, respectively. When the windows to be displayed overlap each other in part or totally, the display data contained in each of the overlapped windows are mapped onto different logical screens, respectively. For example, if there are three overlapped windows, they are mapped onto three logical screens such that the overlapping windows are in one-to-one correspondence with the logical screens. If there are a plurality of display windows on the display terminal which do not overlap each other, then those windows may either be mapped into one logical screen or be mapped onto a plurality of logical screens.

The display driving module 6 does not directly map all the data in a single logical screen onto the display terminal 7, but retrieve data from each of the possible logical screens and synthesizes them into a final screen through the logical screen synthesizing module 5 based on a specific rule. The final screen is mapped onto the display terminal 7. Here, the logical screen synthesizing module 5 may be an FPGA (Field Programmable Crate-Array) or an ASIC (Application Specific Integate Circuit).

Further, the window register stack 8 includes multiple sets of window registers M, each set of window registers is defined for each of the windows to be displayed on the display terminal, referred as window register set $\{WINm_0, WINm_1\}$, where m=0, 1, . . . M. Here, 'm' indicates the identification of the window register set and can be further used to indicates the priority level of the register set. That is, the display windows are in one-to-one correspondence with the sets of window registers. In present embodiment, each set of window registers is composed of two registers and assigned with a predetermined priority level, shown in Table 1. Based on the priority level, the set of registers are correlated with a window. The window registers can be in any types of memory known in the art. The position coordinates of the window and the identification of its corresponding logical screen are written into the corresponding window register set.

The definition of each set of window registers is shown in Table 1.

TABLE 1

| | BIT | | | | | |
|---|---|---|---|---|---|---|
| REG | 31 | 30~27 | 26~16 | 15~13 | 12~10 | 9~0 |
| $WINm_0$ | Rev | Rev | x0 | Rev | Rev | y0 |
| $WINm_1$ | En Flag | Rev | x1 | SID | Rev | Y1 |

Here, x0, y0 are the abscissa and ordinates of the pixel on the upper left corner and x1, y1 are the abscissa and ordinates of the pixel on the lower right corner of a window, respectively. These coordinates define the physical location of the window on the display terminal, which are referred to as the window location coordinates for determining the size and location of the window. SID represents an identification of a logical screen corresponding to the window, that is, identifies the logical screen where the display data of the window are stored. The addresses in the video memory where the window display data are stored can be calculated from x0, y0, x1, y1, and SID. Since there is a one-to-one correspondence relation from each of the logical screens to the display terminal, x0, y0, x1, y1 determine a unique location of the window on the display terminal, and SID determines which logical screen it relates to. Therefore, data of which logical screen are in correspondence with that window can be calculated by a reverse mapping. The enabling bit En is an active/inactive flag of the window, e.g., setting the enabling bit En to "1" means that the window is active, and resetting it to "0" means that the window is inactive.

In present embodiment, the window register set WIN0 is specified to be of the lowest priority level, the window register set $WIN_M$ is of the highest priority, M>1. Of course, the window register set $WIN_M$ may be specified to have lowest priority level and WIN0 has the highest priority level. The priority level of each set of window registers can be set in advance. When multiple windows overlap each other, it is specified that the priority level of a window which covers other windows in part or totally in the overlapping region is higher than that of the covered windows. That is, a window corresponding to a set of window registers of higher priority overlaps windows corresponding to other sets of windows register of lower priority levels. Each of the windows is set to correspond to individual set of window registers with priority levels different from each other according to the requirements of display. When a window is required to be displayed, the logical screen mapping unit 3 performs the following operations: writing display data of the window into its corresponding logical screen by storing them in the video memory; assigning a corresponding set of window registers to the window based on its display priority level, writing position coordinates of the window and the identification of the mapped logical screen into the corresponding window register set pertaining to the window; and setting the enabling bit to be active (e.g. to "1"). Consequently, the logical screen synthesizing module 5 maps the data of the window onto the display terminal and displays them. In this way, to close a window only needs to modify the enabling bit En in the window register set so as to make it inactive, then the logical screen synthesizing module make the window disappear from the display terminal by changing the mapping mode. When multiple windows are overlapped, what is needed to do is only to write the display data of the multiple windows once into different logical screens and store the location coordinates of each window and the identification of the corresponding logical screen into individual set of window registers with particular priority level. The embedded display of the windows can be realized by scheduling and managing individual sets of window registers, and it is not necessary to redraw the portion covered by a window when the window is closed.

Figure 3:
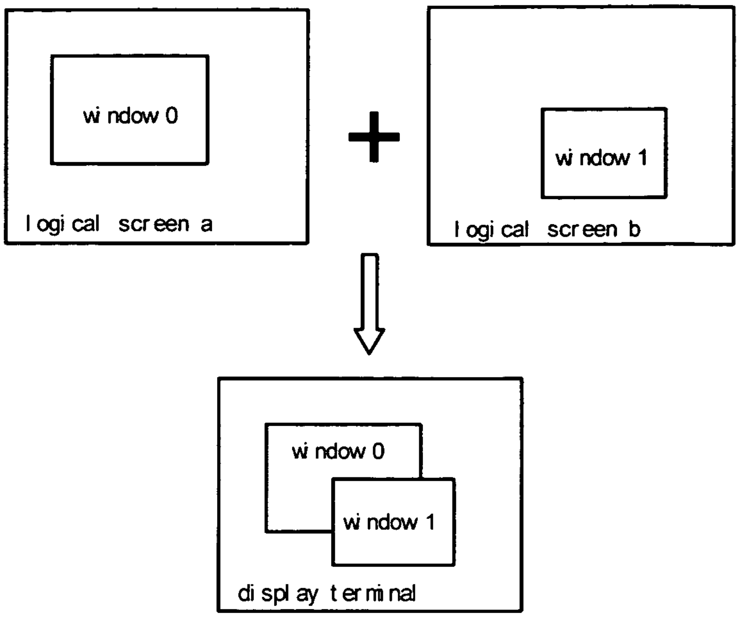
FIG. 3 is a schematic diagram showing the superposition of the multi-level windows of the present invention.
Figure 4:
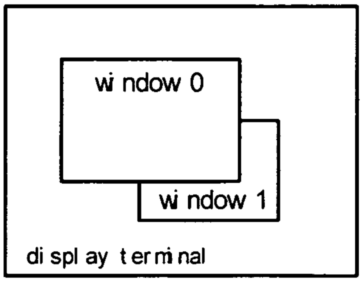
FIG. 4 is a schematic diagram showing the switching of the multi-level windows of the present invention.

FIG. 3 is a schematic diagram showing the multi-level windows overlapping display. The window 0 maps onto a logical screen a, and display data of the window 0 are written into the logical screen a. Assumed that the window 0 corresponds to the window register set WIN0, after the x0, y0, x1, y2 and SID of the window register set WIN0 have been set and the enabling bit En is enabled, the window 0 appear on the display terminal via the synthesizing module 5 and driving module 6. The window 1 is mapped onto a logical screen b, display data of the window 1 are written into the logical screen b, and then the window 1 is correlated to the window register set WIN1. Since window 0 and window 1 are written into different logical screens, they do not interfere with each other even if they overlap each other. Since the priority level of the window register set WIN0 corresponding to window 0 is lower than the priority level of the window register set WIN1 corresponding to window 1, when the enabling bit En of the window register set WIN1 is enabled, window 1 are also mapped onto the display terminal. However, according to the overlapping rule, the window 1 with higher priority overlaps the window 0 in the overlapping region. Further, what is needed to do to close the window 1 is just to reset the enabling bit En of the window register set WIN1; thereby window 1 will disappear from the display terminal. During this process, it does not need to redraw the overlapped portion of the window 0. If we hope to have window 0 overlap window 1, what is needed to do is only to copy the contents of the window register set WIN0 into a window register with higher priority level such as register set WIN2, then window 0 will appear on the top of the window 1, as shown in FIG. 4. As stated in the above, the embedded display of multi-level windows can be flexibly realized by scheduling and managing the multiple sets of window registers. The number of windows that can be overlapped in the same region depends on the number of logical screens, that is, N+1 windows can be overlapped by means of N+1 logical screens.

The synthesis of logical screens is performed by the logical screen synthesizing module 5, which can be in the form of hardware circuit. The display terminal displays individual pixels on the screen in a scanning mode according to specific timing. The logical screen synthesizing module 5 maps the data retrieved from a logical screen onto the pixels to be displayed on the display terminal under control of the display timing. Please note that, although as many as N+1 logical screens have been defined, it is not necessary to retrieve and synthesize all the data in the logical screens from the video memory, but only the data in the logical screens to which the display pixels correspond uniquely after the application of the window priority rule have to be applied.

Figure 5:
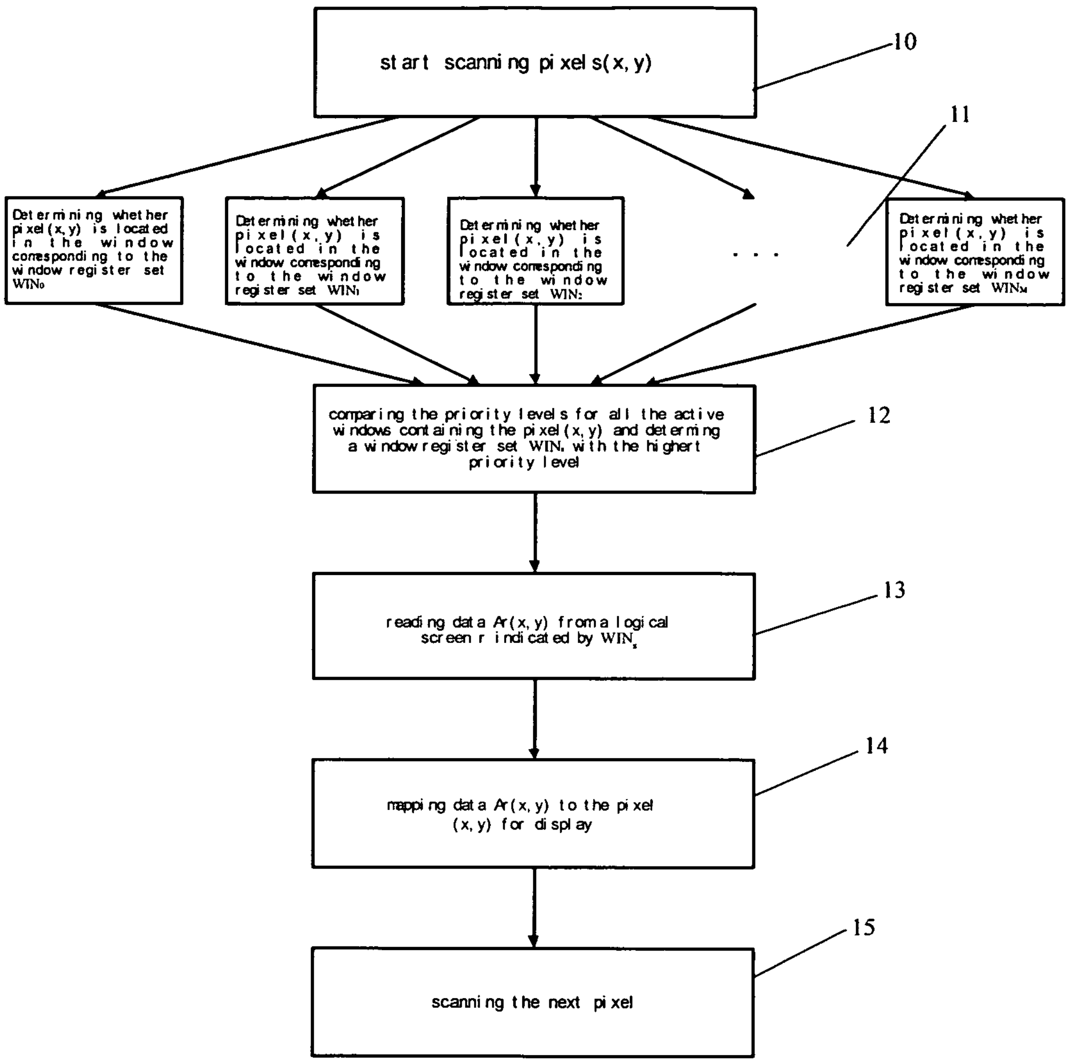
FIG. 5 is a flowchart showing the synthesis of the logical screens according to the present invention.

FIG. 5 shows a specific flow chart of the logical screen synthesis, comprising the following step:

The process begins with scanning display pixels at step 10 and then proceeds to step 11.

At Step 11, the current pixel (x, y) is detected and determined to reside which active windows by means of the coordinates (x, y) of the current pixel. An active window refers to a window that shall be displayed on the display terminal and the enabling bit of the corresponding window register set is enabled. The specific detecting process includes: comparing the abscissa x of the pixel (x,y) to the x0 and x1 of the window coordinates written into the down register set, and comparing the ordinate y of the pixel (x,y) to the y0 and y1 of the window coordinates written into the window register set. If the condition $x0 \leq x \leq x1$ and $y0 \leq y \leq y1$ are satisfied, then it is determined that the coordinates (x,y) of the current pixel reside in the window corresponding to the window register set. An active set of window registers that contains the coordinates (x,y) of the current pixel, are referred to as a candidate. Preferably, the candidate window register set can be obtained in two ways. One is to compare the coordinates (x,y) of the current pixel to the window location coordinates written into all the sets of window registers. A detecting result is outputted based on the comparison no matter whether the set of window register is active or not, but only those active sets of window registers are considered as dates and allowed to participate in the priority sequencing of step 12. The another way is to detect first whether the enabling bit En of a set of window registers is active or not, the coordinates (x,y) of the current pixel are compared to the window location coordinates written into the set of window register only when it is active, otherwise the next register set is detected. Then the process proceeds to step 12;

At Step 12, one set of window registers with the highest priority level among the candidates are hit as a selected set of window registers (please note that a priority level is assigned to each of the window registers in advance). The window overlapping rule specifies that a window corresponding to a set of window registers of higher priority level overlaps windows corresponding to other sets of window registers of lower priority levels. Based on the detecting results of the pixel (x, y) on all windows, it can be determined that the pixel (x, y) shall be located within an active set of window registers (assumed to be WINs) which has the highest priority. Then the process proceeds to step 13.

At Step 13, the display data Ar(x, y) are read out of a logical screen ‘r’ from the video memory based on the SID designated by the selected window register WINs. Then the process proceeds to step 14.

At Step 14, the display data Ar(x, y) is mapped onto the display terminal pixel (x, y) to be displayed by the display driving module 6. Then the process proceeds to step 15.

At Step 15, after the pixel (x, y) having been display repeating the above steps to scan the next pixel.

In the case that the pixel (x, y) is not confined in any of the active windows, the background display data are displayed on the display terminal. Here, the background display data are mapped onto a designated logical screen. When any of the active windows does not contain the pixel (x, y), the display data corresponding to the current pixel (x, y) are read out directly from the designated logical screen and mapped onto the display terminal.

In the present invention, the display of multilevel windows corresponds to the operation of writing display data into different logical screens in the video memory, and various flexible windows overlapping modes correspond to the management of the window register sets by software. The display data need not to be repeatedly written when the windows are switched, thus the overhead for the CPU to process display tasks and the bandwidth occupied by wry the display data can be reduced. When the Display data are read, it is not necessary to read out data of all the logical screens, but only the data of the logical screen corresponding to the current pixel are read according to the windows overlapping rule. That is, the bandwidth occupied by reading the video memory is not increased. The cost expended is only the increment of the capacity of the video memory while this usually does not result in the significant increment of cost. For example, the resolution of a display terminal is 1280×1024, and the word length of the display data is 16 bits, defining one logical screen requires 2.5 MB of memory space, and expanding to 4 logical screens requires 10 MB of memory space. Currently, the rapid development of the semiconductor technology reduces the price per unit of memory to a very low level, for example, the minimum capacity of the marketing DDR SDRAM (Double Data Rate Synchronous Dynamic Random Access Memory) is 16 MB. That is, expanding from 2.5 MB to 10 MB needs not to pay extra expenditure.

What is claimed is:

1. An apparatus for merging display data from two different video memory logical screens onto a single physical display terminal, the apparatus comprising:

a video memory comprising:

a first video memory logical screen corresponding to all pixels in an entire display region of the physical display terminal; and a second video memory logical screen corresponding to all of the pixels in the entire display region of the same physical display terminal;

a logical screen module for mapping display data of windows required to be displayed on the physical display terminal onto the first video memory logical screen and the second video memory logical screen, wherein the logical screen module maps display data corresponding to windows that correspond to at least some of the same logical coordinates on the physical display terminal onto different video memory logical screens such that, after mapping the display data of each of the windows required to be displayed, the first video memory logical screen and the second video memory logical screen each include a respective subset of different display data corresponding to the same group of pixels for an image displayed on the physical display terminal;

multiple sets of window registers assigned with priority levels, which, based on their priority levels, correspond to the windows to be displayed on the physical display terminal respectively, and each set of the window registers stores location coordinates of its corresponding window and an identification of the corresponding mapped video memory logical screen; and a logical screen synthesizing module for merging the windows required to be displayed on the physical display terminal by selectively retrieving and outputting the display data which is contained in the first video memory logical screen and the second video memory logical screen, wherein the retrieved display data correspond to windows indicated by an active set among the sets of window registers, wherein the logical screen synthesizing module selects display data from only one of the first video memory logical screen or the second video memory logical screen for a currently scanned pixel on the physical display terminal based on the priority levels of the corresponding sets of window registers, and wherein the logical screen synthesizing module selects display data for a pixel corresponding to an overlapped portion of a window from one of the first video memory logical screen and the second video memory logical screen without redrawing the overlapped portion when an overlapping window is closed or when the priority level of an overlapping window changes.

2. The apparatus of claim 1, further comprising a display driving module for receiving the display data from the synthesizing module and mapping the display data to the currently scanned pixel in the physical display terminal.

3. The apparatus of claim 2, wherein the window register set is provided with an Enable bit for activating and deactivating the corresponding window.

4. The apparatus of claim 3, wherein the synthesizing module:

determines active window register sets containing the position coordinates of the current pixel as candidates;

selects one set of window registers with a highest priority among the candidates as a hit register set; and reads the display data corresponding to the current pixel out of the first or second video memory logical screen indicated by the hit register set as the data to be displayed on the physical display terminal.

5. The apparatus of claim 3, wherein the synthesizing module:

determines and lists all the active window register sets in the order of priority level;

selects one active register set having a highest priority level and containing the position coordinates of the current pixel as a hit register set; and reads the display data corresponding to the current pixel out of the first or second video memory logical screen indicated by the hit register set as the data to be displayed on the physical display terminal.

6. The apparatus according to claim 3, wherein the logical screen module is further configured for:

mapping the display data of windows that do not overlap each other onto a same video memory logical screen or different video memory logical screens respectively.

7. The apparatus according to claim 3, wherein the display of a first window that at least partially overlaps a second window is switched such that the second window at least partially overlaps the first window by setting the priorities of individual window register sets and changing the correspondence to the window registers of the first or second window to be switched.

8. A method for merging display data from two different logical screens onto a single physical display terminal, the method comprising a window mapping step and a window synthesizing step, wherein the window mapping step comprises the following steps:

mapping display data of windows to be displayed on the physical display terminal onto a first video memory logical screen corresponding to all pixels in an entire display region of the physical display terminal and a second video memory logical screen corresponding to all of the pixels in the entire display region of the same physical display terminal, wherein display data corresponding to windows that correspond to at least some of the same logical coordinates on the physical display terminal are mapped onto different video memory logical screens such that, after mapping the display data of each of the windows required to be displayed, the first video memory logical screen and the second video memory logical screen each include a respective subset of different display data corresponding to the same group of pixels for an image displayed on the physical display terminal;

storing the display data corresponding to the first video memory logical screen and the second video memory logical screen into a video memory;

correlating multiple sets of window registers with respective windows to be displayed on the physical display terminal according to priority levels of the sets of window registers; and storing location coordinates of the corresponding windows and an identification of the corresponding video memory logical screens into the correlated window register sets respectively; and wherein the window synthesizing step comprises the following steps:

receiving the location coordinates of a current scanning pixel; and selecting and outputting the display data which is contained in only one of the first video memory logical screen or the second video memory logical screen as indicated by an active window register set with a highest priority level, based on the location coordinates of the current scanning pixel; and selecting display data for a pixel corresponding to an overlapped portion of a window from one of the first video memory logical screen and the second video memory logical screen without redrawing the overlapped portion when an overlapping window is closed or when the priority level of an overlapping window changes.

9. The method of claim 8, wherein each window register set is provided with an Enable bit for activating and deactivating the corresponding window.

10. The method of claim 9, wherein selecting and outputting the display data comprises:

determining all the active window register sets containing the position coordinates of the current scanning pixel as candidates;

selecting the window register set with the highest priority level among the candidates as a hit register set; and reading the display data corresponding to the current scanning pixel out of the first or second video memory logical screen indicated by the hit register set as the data to be displayed on the physical display terminal.

11. The method of claim 9, wherein mapping the display data onto the first video memory logical screen and the second video memory logical screen comprises:

mapping the windows not overlapping each other onto a same video memory logical screen or different video memory logical screens respectively.

12. The method according to claim 9, further comprising the following steps:

predetermining the priority level for each set of window registers; and correlating a window which overlaps other windows to a set of window registers with a higher priority level and correlating an overlapped window to a set of window registers with a lower priority level.

13. The method according to claim 12, wherein if position coordinates of the current scanning pixel is not contained in any of the active windows, then the display data corresponding to the current scanning pixel are read from a video memory logical screen corresponding to a background display and outputted to the physical display terminal.

14. An apparatus for merging display data from two different video memory logical screens onto a single physical display terminal, the apparatus comprising:

a video memory comprising:

a first video memory logical screen corresponding to all pixels in an entire display region of the physical display terminal; and a second video memory logical screen corresponding to all of the pixels in the entire display region of the same physical display terminal;

a logical screen module for mapping display data of a plurality of windows required to be displayed on the physical display terminal onto the first video memory logical screen and the second video memory logical screen, wherein at least two of the plurality of windows are overlapping windows that correspond to at least some of the same logical coordinates on the physical display terminal, and wherein the logical screen module maps display data corresponding to the overlapping windows onto different video memory logical screens such that, after mapping the display data of each of the windows required to be displayed, the first video memory logical screen and the second video memory logical screen each include a respective subset of different display data corresponding to the same group of pixels for an image displayed on the physical display terminal;

multiple sets of window registers assigned with priority levels, which, based on their priority levels, correspond to the windows to be displayed on the physical display terminal respectively, and each set of the window registers stores location coordinates of its corresponding window and an identification of the corresponding mapped video memory logical screen; and a logical screen synthesizing module for merging the plurality of windows required to be displayed on the physical display terminal by selectively retrieving and outputting the display data which is contained in the first video memory logical screen and the second video memory logical screen, wherein the retrieved display data correspond to windows indicated by an active set among the sets of window registers, wherein the logical screen synthesizing module selects display data from only one of the first video memory logical screen or the second video memory logical screen for a currently scanned pixel on the physical display terminal based on the priority levels of the corresponding sets of window registers, wherein when the currently scanned pixel corresponds to an overlapping window, the logical screen synthesizing module determines the priority levels of the sets of window registers corresponding to the overlapping windows, identifies a video memory logical screen corresponding to a set of window registers having a highest priority level among the sets of window registers corresponding to the overlapping windows, and selects display data from one of the first video memory logical screen or the second video memory logical screen based on the identified video memory logical screen, and wherein the logical screen synthesizing module selects display data for a pixel corresponding to an overlapped portion of a window from one of the first video memory logical screen and the second video memory logical screen without redrawing the overlapped portion when an overlapping window is closed or when the priority level of an overlapping window changes.

* * * * *